(12) United States Patent
Dujardin et al.

(10) Patent No.: US 7,771,188 B2
(45) Date of Patent: Aug. 10, 2010

(54) DEVICE FOR GRIPPING THE NECK OF HOLLOW BODIES AND HOLLOW BODY TRANSPORT INSTALLATION WHICH IS EQUIPPED WITH SUCH DEVICES

(75) Inventors: Willy Dujardin, Octeville sur Mer (FR); Christophe Lapert, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 519 days.

(21) Appl. No.: 11/885,274

(22) PCT Filed: Mar. 10, 2006

(86) PCT No.: PCT/FR2006/000539
§ 371 (c)(1), (2), (4) Date: Aug. 29, 2007

(87) PCT Pub. No.: WO2006/095099
PCT Pub. Date: Sep. 14, 2006

(65) Prior Publication Data
US 2008/0166440 A1 Jul. 10, 2008

(30) Foreign Application Priority Data
Mar. 11, 2005 (FR) .................................. 05 02446

(51) Int. Cl.
*B29C 49/68* (2006.01)
*B29C 31/08* (2006.01)

(52) U.S. Cl. ...................... 425/526; 198/803.7; 294/90; 294/902; 425/534

(58) Field of Classification Search ................. 425/526, 425/534; 294/90, 902; 198/470.1, 803.7
See application file for complete search history.

(56) References Cited

U.S. PATENT DOCUMENTS

| 2,899,232 | A | * | 8/1959 | Walter, Jr. | 294/65 |
| 3,894,630 | A | * | 7/1975 | Shank, Jr. | 198/470.1 |
| 3,967,847 | A | * | 7/1976 | Ellis | 198/803.9 |
| 4,093,296 | A | * | 6/1978 | Itoh | 294/90 |
| 4,432,720 | A | | 2/1984 | Wiatt et al. | |
| 5,295,723 | A | * | 3/1994 | Kronseder | 294/88 |
| 2002/0037338 | A1 | | 3/2002 | Lisch et al. | |
| 2004/0121038 | A1 | | 6/2004 | Seki et al. | |

FOREIGN PATENT DOCUMENTS

FR 2 789 932 A 8/2000

* cited by examiner

*Primary Examiner*—Robert B Davis
(74) *Attorney, Agent, or Firm*—Sughrue Mion, PLLC

(57) ABSTRACT

A gripper device for gripping the neck of a hollow body from the outside, which gripper device includes an annular body supporting at least two gripper parts each having its own bearing face, said gripper parts being movable substantially radially and constrained by an elastic device in such a way that the gripper parts are able to occupy a first radial position in which they bear against a buffer of the annular body with their bearing face projecting into the annular body, and a second radial position in which they are pushed back with their bearing face bearing against the exterior wall of the neck of a hollow body engaged in the annular body. The bearing faces of the gripper parts are bowed in the overall shape of an arc of a cylinder.

13 Claims, 2 Drawing Sheets

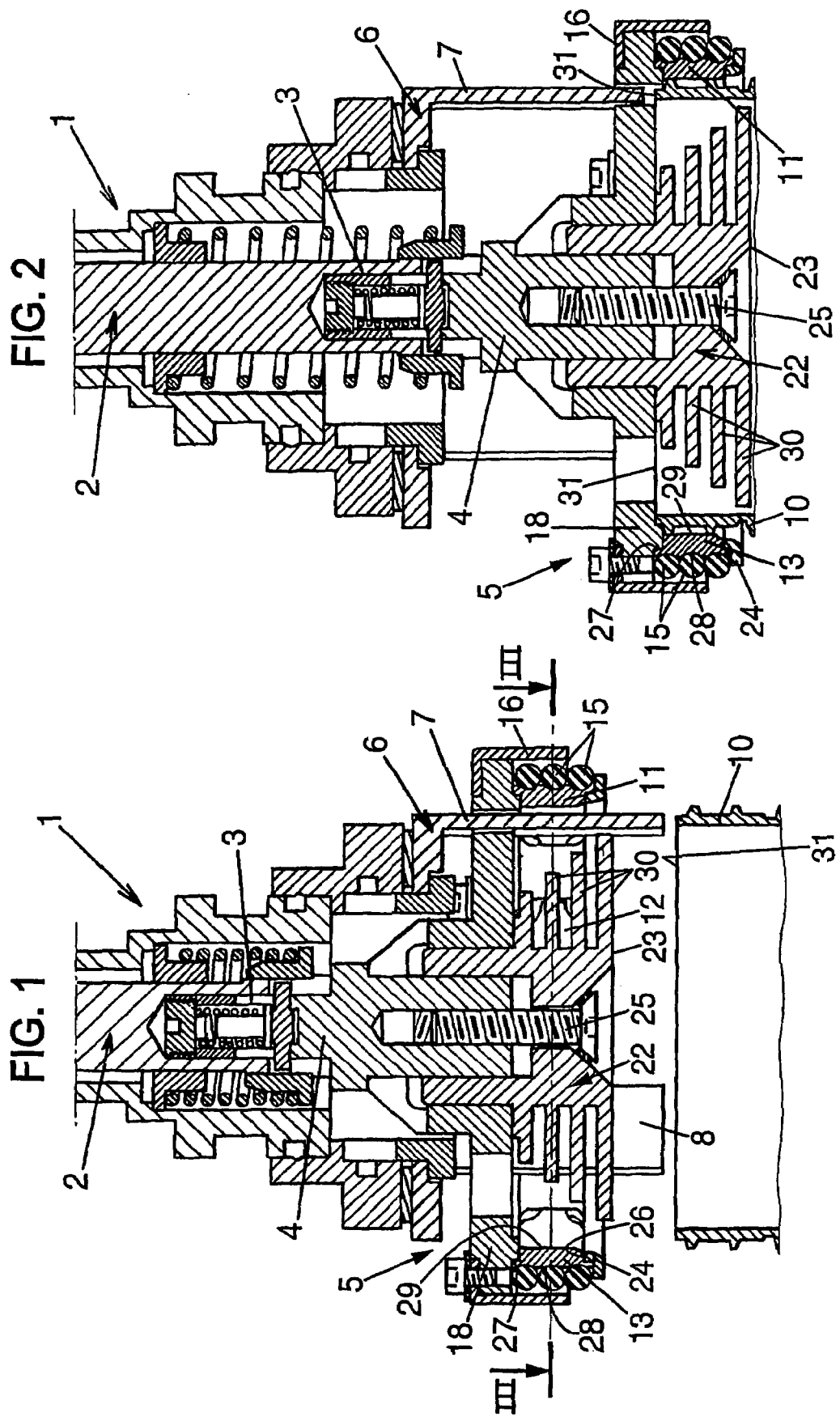

DEVICE FOR GRIPPING THE NECK OF HOLLOW BODIES AND HOLLOW BODY TRANSPORT INSTALLATION WHICH IS EQUIPPED WITH SUCH DEVICES

TECHNICAL FIELD

The invention relates to the field of the manufacture or processing of hollow bodies, particularly containers, each having their own neck, such as bottles, made of a thermoplastic by blow-molding or stretch-blow-molding heated preforms.

The invention is more particularly concerned with in-line processing plants designed for this type of manufacture or processing, in which the hollow bodies having a neck (a "hollow body" is to be understood in the present document to denote the preforms of containers, or alternatively the finished containers, or possibly intermediate containers, that is to say any type of hollow body having two distinct parts, namely a neck and a second part termed the "body" which may be found in the plants at which the invention is targeted) are moved individually one after another using conveyer devices. Some of these conveyer devices are designed to hold the hollow bodies by their neck, so as to leave their bodies unobstructed.

BACKGROUND OF THE INVENTION

Manufacturing a finished container directly from a preform in a simple blow-molding machine and likewise manufacturing an intermediate container from a preform, or alternatively manufacturing a finished container from an intermediate container in a machine involving two blowing steps entails heating the body of the preform or of the intermediate container in a thermal conditioning unit, or oven, in which the material of which the body of the preform or of the intermediate container is made is heated by infrared lamps to raise it to a temperature above its glass transition temperature without, however, reaching its crystallization temperature. It is at the end of this phase during which its body is thermally conditioned that the preform or the intermediate container is transferred to a mold of a blow-molding or stretch-blow-molding unit in order to mold the finished or intermediate container by deforming the softened body.

The neck of this type of hollow body is always produced, when the preform is being manufactured by injection molding, at the definitive shape and size of the neck of the finished container and must not be deformed during subsequent treatment leading to the finished container; in particular, the neck must not be heated in such a way that it can soften. For this reason, the thermal conditioning unit is designed so that the neck of the preform of the intermediate container is protected from the heating elements as well as possible.

In on-line processing plants, the heat treatment is performed in tunnel ovens through which the hollow bodies (preforms or intermediate containers) are moved, by endless conveyer devices equipped with gripper devices capable of gripping them by their neck, the gripper devices also being mounted such that they can rotate on respective conveyer elements that make up the conveyer device so that the actual bodies of the hollow bodies, revolving on themselves, are exposed on all of their periphery to the heating lamps which are positioned down one side of the oven. In order to protect the necks during the journey through the ovens, it is known practice for the ovens to be equipped with protective shields positioned on each side of the path followed by the hollow bodies just at the boundary between their neck and their body.

These shields form a screen and any radiation emitted by the heating lamps cannot reach the necks of the preforms or the intermediate containers directly.

However, because the radiation emitted by the lamps travels in all directions, some of the radiation may reach the necks from the inside of the hollow bodies after having entered these.

Nonetheless, in a common arrangement of the conveyer devices, the gripper devices for gripping the necks are configured in such a way as to be inserted inside the necks (a technique known as "donning" from the inside) and to hold them by clamping against the interior face of said necks. In this case, it is the heads of the gripper devices introduced into the necks which, by acting like a stopper, prevent any radiation that has entered the hollow bodies from reaching their necks.

For certain applications, however, it has become advantageous for the hollow bodies no longer to be grasped by the internal face of the neck, for example with a view to avoiding any bacteriological contamination of this face which will later have to be in contact with the product with which the finished container will be filled. That also makes it possible to eliminate any risk of scratching the internal face of the neck. In such cases, a gripper device that grips the hollow body from the external face of the neck (using the technique of "donning" from the outside) is then used.

Document FR 2 789 932 discloses a device for conveying hollow bodies, here consisting of preforms, equipped with gripper devices designed for donning from the outside and each comprising gripper claws which grasp an external face of the neck of the preform. The gripper device also comprises a central core which penetrates the inside of the neck axially and has a reflective lower transverse face which, when the preform is in place on the gripper device, lies axially more or less at the boundary between the neck and body of the preform.

More specifically, the gripper device comprises a gripper bell which has a circular top plate and a cylindrical skirt extending axially downward from the peripheral edge of the plate, so that the bell thus defines a cylindrical space that is open at the bottom. The bell has slits angularly distributed about its axis of revolution; each slit extends axially over the entire height of the skirt and also extends radially over approximately the outermost third of the plate. Thus, delimited between two slits is an elastically deformable claw, of which the free end, formed by the lower edge of the skirt, can move radially with respect to the axis of revolution of the bell. The bell thus designed is able to fit over the neck of the preform, the claws elastically grasping the external face of the neck. The internal face of the free end of the claws is smooth, which means the preform is grasped and held by simple radial clamping. The bell is made of a plastic material of the polyacetal type. To enhance the clamping force, an annular spring may encircle the bell at the lower edge of the skirt to force the free end of the claws radially inward. In the example proposed, the spring is housed in a circular groove formed on the external face of the skirt, at its lower edge.

The gripper device described in document FR 2 789 932 is mounted with rotation about its axis on a conveyer element that makes up the conveyer device.

The applicant company is assuming that the gripper device described in document FR 2 789 932 may be responsible for incidents such as the breakage of infrared heating lamps, and for problems of synchronization with the transfer means that affect the transfer between the oven that the hot preforms leave and the blow-molding unit. These problems are thought to be due to poor positioning of the neck of certain preforms in the gripper device. There are a great many parameters that can affect how well the preforms are gripped; for example: variation in dimensions of preforms, poor positioning of components on the preform conveyer line, thermal expansion associated with temporarily insufficient cooling of the gripper means, vibration, and thermal and/or mechanical fatigue.

The applicant company would therefore like to modify the structure of the gripper means in order as far as possible to reduce the number and frequency of the abovementioned incidents.

None of the fixtures of the prior art known to the applicant company seems able to reduce the frequency of these incidents, and some of these anterior devices are liable to cause other incidents.

Document US 2004/0121038 discloses a gripper device designed for the donning from the outside of a neck of a hollow body such as a preform. This gripper device comprises a bell-shaped component, the lateral wall of which is equipped with radial housings, distributed peripherally, opening to the inside via a narrowed opening; each housing houses a ball which is pushed back through the opening by an elastic member in such a way that the ball projects partially from the internal wall of the bell so that it can bear elastically under a relief on the external face of the neck of a preform pushed into the bell. In the example illustrated in FIG. 8 of that document, the balls bear against the edge of an annular groove made at the base of the neck of the preform and adjacent to the flange of the neck, the external edge of the bell bearing against the flange. This arrangement has the disadvantage of requiring the bell to be pushed a great way on to the neck; what is more, there is not always an annular groove at the base of the neck of the preforms.

More rapid donning could be obtained by pushing the bell on to the neck by a smaller amount, so that the balls could bear against reliefs formed by the screw thread designed for screwing a cap on to the finished and filled container. This type of donning could be suitable for all types of neck, including those, which have no annular groove at their base. However, in this case, because the screw thread is inclined, the balls would not all find identical bearing surfaces that converged radially in one and the same plane, which means that a torque would arise liable to cause the hollow body to become skewed, and the disadvantages set out above would then be experienced once again with the risk of the hollow body (the preform or the intermediate container) knocking against heating lamps and the risk of nonuniform heating of this object as it moves along, rotating, in its passage through the oven. In addition, the configuration of the screw thread on the neck of the hollow body may differ with different hollow bodies (single flight or portions of flights, different pitch and therefore different angles of inclination of the flight or flights, etc.): this would therefore cause the way in which the balls bear against the screw thread to vary according to the hollow bodies being handled.

It is a primary objective of the invention to propose an improved structure of a device for gripping hollow bodies by the neck which sets aside the above-mentioned disadvantages of the devices of the prior art and which is better able to meet the requirements of current practice, while at the same time remaining robust and reliable in design but simple and inexpensive.

The invention also aims to provide a device for gripping hollow bodies by the neck which is very able to tolerate dimensional variations in the diameter of the neck, and can quickly be adapted to suit different neck external contours.

The invention also aims to provide a device for gripping hollow bodies by the neck which takes up exactly the same amount of space as the devices that already exist on conveyer devices currently in use in order, in particular, that the anterior devices can be replaced, without any problems, with devices according to the invention.

SUMMARY OF THE INVENTION

To these ends, the invention proposes a gripper device for gripping the neck of a hollow body from the outside, which gripper device comprises an annular body supporting at least two gripper parts each having its own bearing face, said gripper parts being movable substantially radially and constrained by elastic means in such a way that said gripper parts are able to occupy a first radial position in which they bear against a buffer of the annular body with their bearing face projecting into the annular body, and a second radial position in which they are pushed back with their bearing face bearing against the exterior wall of the neck of a hollow body engaged in said annular body, which gripper device, being arranged according to the invention, is characterized in that the bearing faces of said gripper parts are bowed in the overall shape of an arc of a cylinder.

By virtue of this arrangement, the gripper parts bear against the outside of the reliefs on the external face of the neck of the hollow bodies whatever these reliefs might be, and irrespective of their shape; in particular, they can bear against the screw threads, regardless of the configuration thereof, when such screw threads are present. Furthermore, the gripping capability of the device remains independent of whether or not there is an annular groove on the external face of the neck; however, the clamping forces of the gripper parts are all sure to be radial and to lie in the same plane, which means the neck is held uniformly around its entire periphery, thus ensuring that the hollow body is positioned with its axis coinciding with the axis of the gripper device.

In a preferred embodiment, provision is made for the annular body to comprise at least two slots and for the gripper parts to be engaged through these slots respectively.

Still as a preference, provision is also made for the gripper parts to be ring segments and for the slots to be elongate slots.

To make it easier for the gripper parts to slide, on the external face of the neck during donning, it is advantageous for at least one gripper part to comprise a frustoconical lower end portion and/or a projection on its bearing face.

In order to ensure a clamping force that is uniformly distributed around the periphery of the neck, it is desirable for the gripper parts to be distributed substantially equidistant from one another on the annular body.

In one concrete exemplary embodiment, provision is made for the gripper parts and the respective slots to be four in number, in diametrically-opposed pairs, thereby resulting in a simple structure, while ensuring that there is well balanced clamping on the perimeter of the neck.

In a simple and economical embodiment, the elastic means comprise at least one ring made of an elastic material surrounding the annular body and the gripper parts, and advantageously, the elastic means comprise several juxtaposed elastic O-rings; such O-rings are commonly available and commonly held in stock; in addition, the use of several O-rings (for example three O-rings in a typical exemplary embodiment) allows the return force exerted on the gripper parts and therefore the clamping force exerted on the necks to be adjusted relatively precisely; furthermore, this kind of set-up may prove to be fail-safe insofar as, if one O-ring breaks during operation, a clamping force is still maintained and the hollow body does not drop out.

To protect the elastic means, an annular skirt secured to the annular body and supported thereby, may advantageously be provided, this skirt extending radially externally to the elastic means.

It is desirable for the gripper device to comprise ejection means comprising at least one finger substantially parallel to the axis of the annular body and able to move parallel to this axis.

It is also desirable for the gripper device to comprise a core internal to the annular body and coaxial therewith, having a lower transverse face which is reflective to electromagnetic radiation, so as to protect the neck against the heat trapped inside the hollow body.

Although the gripper device designed according to the invention may, on account of its structure, be used for transporting any type of hollow body that has a neck in an on-line manufacturing plant, one particularly preferred application, and the one targeted by the invention, is that of fitting out a device for conveying hollow bodies that have a neck, this conveying device comprising a multitude of conveying elements coupled one after the other into an endless chain and which comprise respective gripper devices for gripping individual hollow bodies by their necks, said gripper devices being arranged according to the invention as explained hereinabove; in particular, this may be a conveyer device able to convey preforms or intermediate containers and designed to run through a tunnel oven for heating the preforms upstream of a blow-molding or stretch-blow-molding plant for molding the hot preforms or intermediate containers, the conveyer elements being arranged in such a way that, as they move, the respective gripper devices are given a rotational movement about their axis so that the bodies of the preforms or of the intermediate containers are exposed over their entire periphery to the heating lamps positioned down one side of the oven.

The invention finds a highly advantageous industrial application in a thermal conditioning oven for a plant for blow-molding thermoplastic containers, particularly PET bottles.

BRIEF DESCRIPTION OF THE DRAWINGS

Other objects and advantages of the invention will become apparent during the course of the description which follows of certain preferred embodiments which are given purely by way of illustration, in which description reference is made to the attached drawings in which:

FIG. 1 is a view in diametral section of part of a conveyer element equipped with a gripper device for gripping hollow bodies by their neck, said gripper device being shown empty (not gripping the neck of a hollow body);

FIG. 2 is a view in diametral section of the device of FIG. 1 shown in the operational position, the neck of the hollow body, for example, a preform, being in the position in which it is grasped by the gripper device.

Figure 3:
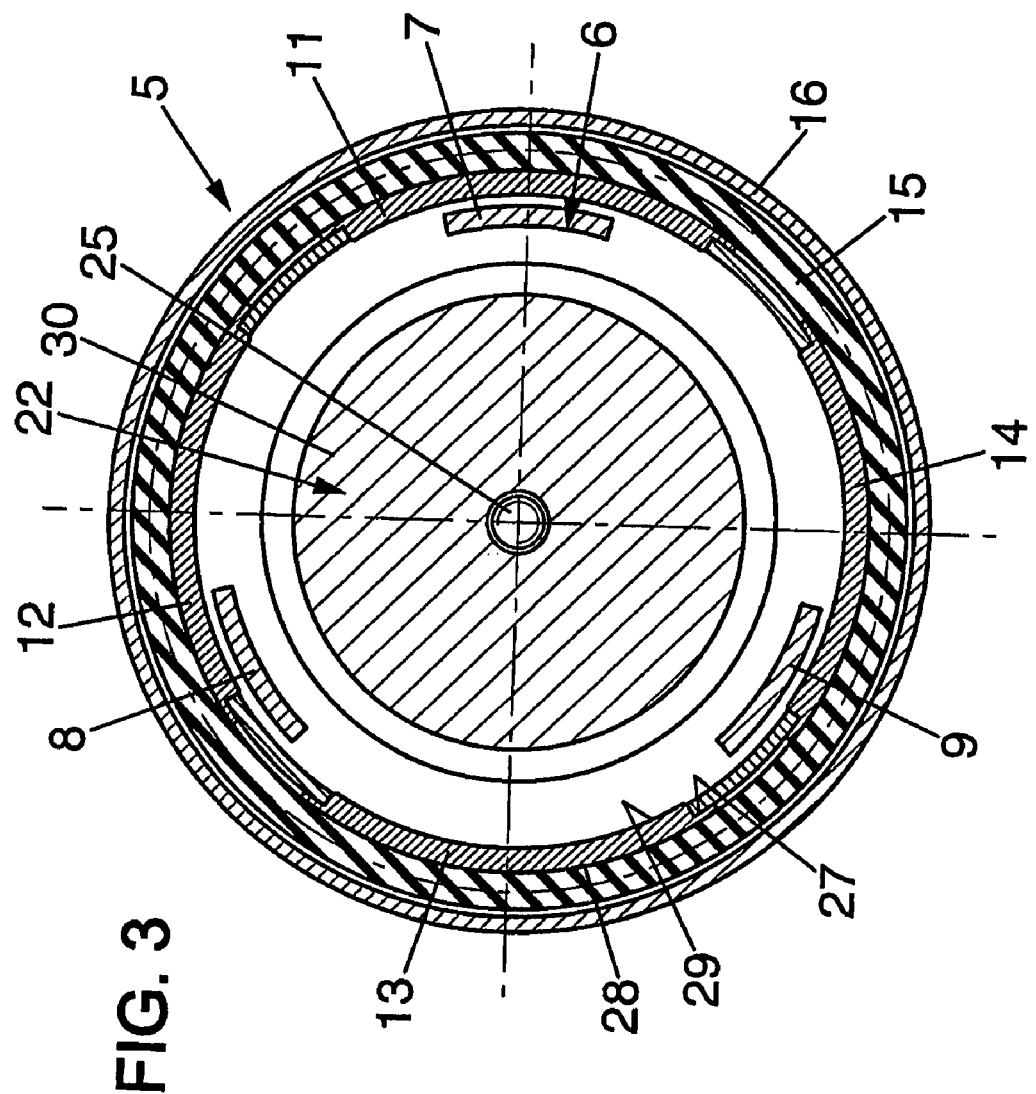
FIG. 3 is a section on III-III of FIG. 1.

DESCRIPTION OF THE PREFERRED
EMBODIMENT OF THE INVENTION

For the sake of clarity in the description which follows, notions such as top, bottom, lower, upper will be used with reference to the layout of the elements as depicted in the figures, without these terms necessarily denoting the precise situation of the components in the machine, especially since, in certain container manufacturing plants, the conveyer device is designed to invert the individual conveyer elements upstream of the oven once they have gripped the preforms or intermediate containers in the neck-up orientation so that the preform or the intermediate container files past the heating means in the oven neck down, and then to invert the preforms or intermediate containers again downstream of the oven into the head-up position before introducing them into the blow-molding machine.

Reference is made first of all to FIG. 1 which depicts the lower part of a conveyer element that makes up a conveyer device formed of a number of such elements secured together in an articulated manner one after the other into an endless chain.

When the conveyer device is fitted to an appropriate tunnel oven for heating hollow bodies in a plant for manufacturing containers made of thermoplastic such as PET, each conveyer element that makes up the conveyer device, as it passes through the oven, is rotated about its axis (spun) in such a way that the actual body of the hollow body is exposed over its entire periphery to the heating means positioned down one side of the oven.

The conveyer element, denoted overall by the reference 1, comprises a rotating mandrel 2 (driven by means that have not been depicted but which are known to those skilled in the art) provided with a central bore 3 in which there is mounted a support rod 4 belonging to a device denoted in its entirety by the numerical reference 5, for grasping the neck 10 of a hollow body.

The rod 4 is mounted removably on the mandrel 2. A fixture such as this, of the bayonet fitting type, is known per se and used by the applicant company. The upper part of the rod 4 forms a bayonet base intended to be housed in a corresponding bayonet holder formed at the lower end of the bore 3, with axial stacking of a bearing cone.

The gripper device 5 comprises an annular body 18 in the overall shape of a circular bell open at the bottom and mounted coaxially on the rod 4, for example using an axial screw 25. The annular body 18 has a skirt 24, the overall shape of which is that of a cylinder of revolution which is pierced with several perimetrically elongate slots 26. Preferably, the slots are distributed equal distances apart and are substantially identical.

The gripper device comprises several bowed gripper parts, in the shape of an arc of a cylinder, the number of which is equal to the number of slots 26 and which are engaged through the respective slots 26. There may be any number, odd or even, of slots and gripper parts.

In the example illustrated in FIGS. 1 and 3, there are four gripper parts, this number being considered to be the compromise best suited in practice to obtaining correct gripping of the neck 10 with the minimum number of parts. The four gripper parts are denoted by the numerical references 11, 12, 13, 14 respectively in the figures.

The gripper parts 11-14 are therefore in the overall shape of substantially identical and equidistant ring sectors or sections, in this instance in diametrically opposed pairs. The use of identical and equidistant bowed sectors allows for ease of assembly without the risk of error, and ensures the weight of the hollow body is evenly balanced.

The gripper parts 11-14 are shaped with a peripheral shoulder 27 so that their radially outer face 28 has a larger dimension than the slot 26 and so that each gripper part can bear against the rear peripheral edge, that forms a buffer, of the respective slot 26. In addition, the gripper parts 11-14 have a radial dimension or thickness which exceeds the wall thickness of the skirt 24 which means that the radially inner face 29 of each gripper part projects into the internal volume of the bell formed by the annular body 18.

The gripper parts 11, 12, 13, 14 are given a small radial travel through the respective slots by combining them with elastic return means 15 that bring them back to bear against the rear edge of the respective slots. In one simple embodiment, the elastic return means 15 comprise at least one ring made of an elastic material encircling the annular body 18 and the gripper parts 11, 12, 13, 14. For practical purposes, the aforementioned elastic ring is formed of one or more O-rings, three O-rings in the concrete embodiment shown in FIGS. 1 and 3. In this case, the number and characteristics of the material of which the O-ring or rings is or are made is chosen in such a way as to tailor the clamping force exerted on the neck 10 to suit. The O-ring or O-rings are protected from infrared radiation by a metal wall that forms an external skirt 16 attached to the annular body 18.

By virtue of the arrangement that has just been described, the gripper parts 11-14 are able to occupy two radial positions, namely a first position, depicted in FIG. 1, in which each gripper part 11, 12, 13, 14 bears against the rear edge of the respective slot 26 (the standby or empty position), and a second position, depicted in FIG. 2, in which the interior face 29 of each gripper part 11, 12, 13, 14 bears against the neck 10 of a hollow body which has been inserted into the bell defined by the annular body 18.

The radially interior face 29 of each of the gripper parts 11-14 is of a shape that complements the external contour of the neck 10 of the hollow body. If the hollow body is a preform or an intermediate container intended to form a container which is to be sealed by a screw cap, the neck 10 is provided, right from the time of injection-molding of the preform, with a screw thread which is at its definitive size and shape: the gripper parts 11-14 therefore bear against the external edge of the screw thread.

In the example illustrated in FIGS. 1 to 3, each gripper part 11, 12, 13, 14 extends over an angular range of the order of 60° such that their interior face 29 has enough bearing surface area to generate enough friction to hold the neck 10 effectively. A similar result could be achieved by using a higher number (for example, five) of gripper parts of shorter length or a lower number (for example, three) of gripper parts of greater length but this would then carry the risk of not bearing against the neck quite so effectively over the entirety of their length.

In an embodiment that has not been depicted, the gripper parts have their radially internal face 29 exhibiting a frustoconical lower first portion and an upper second portion that is a cylinder of revolution, a step being defined between these first and second portions. This embodiment is advantageous when the neck 10 of the hollow body has an external annular projection, because the hollow body is then grasped by the substantially radial lateral movement of the gripper parts 11, 12, 13, 14, the neck 10 sliding along the frustoconical first portion of the face of the gripper parts, clip-fastening being obtained when an external projection of the neck 10 comes to bear against said projecting step.

A surface treatment, for example, sand-blasting, may advantageously be performed on the radially internal face 29 of the gripper parts 11, 12, 13, 14 so as to increase the coefficient of friction.

It should be noted that the gripper parts 11, 12, 13, 14 are separate parts and that their respective functional clearances are relatively independent of one another. This arrangement allows the gripper device to tolerate appreciable dimensional variations in the necks of the hollow bodies.

In order to prevent any heat trapped inside the hollow bodies from coming into contact with the neck 10, it is possible to carry the protective means used in the gripper device of document FR 2 789 932 over into this device. To do this the gripper device comprises a core 22 fixed coaxially inside the annular body 18 for example using the screw 25, in such a way that at least its lower transverse face 23, that forms a reflective surface, lies approximately at the base of the neck or level with the point where the neck meets the actual body of the hollow body as can be seen in FIG. 2. The core 22 may comprise a radiator, for example, formed of superposed fins 30, in order to remove the heat.

In an embodiment that has not been depicted, the core 22 does not enter the neck 10, thus avoiding the risk of scratching the internal face of this neck and allowing the device to be used in aseptic machines.

It is also possible for the conveyer element 1 to be equipped with an ejection device like the one provided in document FR 2 789 932, which ejection device comprises an annulus 6 equipped with several (typically three) fingers 7, 8, 9 distributed 120 degrees apart on a circle, the diameter of which is substantially identical to, but slightly smaller than the diameter of the mouth 31 of the neck 10. During a preform ejection relative travel, the ejection fingers 7, 8, 9 bear against the mouth 31 of the neck 10 in order to push it axially downwards with respect to the gripper device 5.

The gripper device as has just been described displays numerous advantages.

Gripping the hollow bodies from the outside of their neck 10 allows them to be conveyed in aseptic machines, without touching the inside of the neck 10.

In contrast with the fixture described in document FR 2 789 932, when conveying hollow bodies through a oven, there is no longer any risk of the gripper system being damaged by heat or radiation.

In contrast with many of the gripper devices proposed in the prior art, this gripper device has no "at-risk" mechanical system such as springs, for example, that could undergo a change in their technical properties under the action of heat or in the presence of infrared radiation.

The gripper device is substantially identical in size to those mounted on machines currently in use and it is therefore possible to envision replacing the latter, through a simple exchange.

The invention claimed is:

1. A gripper device for gripping the neck of a hollow body from the outside, which gripper device comprises an annular body supporting at least two gripper parts each having its own bearing face, said gripper parts being movable substantially radially and constrained by elastic means in such a way that said gripper parts are able to occupy a first radial position in which they bear against a buffer of the annular body with their bearing face projecting into the annular body, and a second radial position in which they are pushed back with their bearing face bearing against the exterior wall of the neck of a hollow body engaged in said annular body, wherein the bearing faces of said gripper parts are bowed in the overall shape of an arc of a cylinder.

2. The gripper device as claimed in claim 1, wherein the annular body comprises at least two slots and in that the gripper parts are engaged through these slots respectively.

3. The gripper device as claimed in claim 2, wherein the gripper parts are ring segments and in that the slots are elongate slots.

4. The gripper device as claimed in claim 1, wherein at least one gripper part comprises a frustoconical lower end portion on its bearing face.

5. The gripper device as claimed in claim 1, wherein at least one gripper part comprises a projection on its bearing face.

6. The gripper device as claimed in claim 1, wherein the gripper parts are distributed substantially equidistant from one another on the annular body.

7. The gripper device as claimed in claim 1, wherein the gripper parts are four in number, in diametrically-opposed pairs.

8. The gripper device as claimed in claim 1, wherein the elastic means comprise at least one ring made of an elastic material surrounding the annular body and the gripper parts.

9. The gripper device as claimed in claim 7, wherein the elastic means comprise several juxtaposed elastic O-rings.

10. The gripper device as claimed in claim 7, wherein it comprises an annular skirt secured to the annular body and supported thereby, which extends radially externally to the elastic means.

11. The gripper device as claimed in claim 1, wherein it comprises ejection means comprising at least one finger substantially parallel to the axis of the annular body and able to move parallel to this axis.

12. The gripper device as claimed in claim 1, wherein it comprises a core internal to the annular body and coaxial therewith, having a lower transverse face which is reflective to electromagnetic radiation.

13. A device for conveying hollow bodies one aft another, particularly through a tunnel oven, this conveying device comprising a multitude of conveying elements coupled one after the other into an endless chain and which comprise respective gripper devices for gripping individual hollow bodies by their necks, characterized in that the gripper devices are arranged as claimed in claim 1.

* * * * *